(12) United States Patent
Takao

(10) Patent No.: US 7,764,862 B2
(45) Date of Patent: Jul. 27, 2010

(54) METHOD OF AND APPARATUS FOR SETTING VIDEO SIGNAL DELIMITER INFORMATION JUDGED FROM AUDIO AND VIDEO SIGNALS

(75) Inventor: Yuji Takao, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1106 days.

(21) Appl. No.: 11/434,865

(22) Filed: May 17, 2006

(65) Prior Publication Data

US 2006/0263061 A1 Nov. 23, 2006

(30) Foreign Application Priority Data

May 17, 2005 (JP) .............................. 2005-144191

(51) Int. Cl.
*H04N 5/76* (2006.01)
*H04N 7/00* (2006.01)

(52) U.S. Cl. ......................................... 386/46; 386/96

(58) Field of Classification Search ..................... 386/1, 386/45–46, 95–96, 111–112, 124–126
See application file for complete search history.

(56) References Cited

U.S. PATENT DOCUMENTS 7,269,330 B1 * 9/2007 Iggulden ...................... 386/46

2005/0198570 A1 * 9/2005 Otsuka et al. ................ 715/515

FOREIGN PATENT DOCUMENTS

JP 2000-354225 12/2000
JP 2003-047031 2/2003

* cited by examiner

*Primary Examiner*—Thai Tran
*Assistant Examiner*—Nigar Chowdhury
(74) *Attorney, Agent, or Firm*—Pillsbury Winthrop Shaw Pittman, LLP

(57) ABSTRACT

Even when there are a plurality of scene changes in an arbitrary (e.g., commercial) interval or when a plurality of audio modes are mixed in a program, chapter division points can be set suitably. An apparatus comprises an image structuring section which analyzes the similarity between consecutive frames of a video signal and obtains first delimiter information that provides delimitation according to the semantic content of the video signal and an arbitrary interval detecting section for an audio signal. The apparatus creates second delimiter information for silent portions in the audio signal, sets an arbitrary interval, and creates third delimiter information by superimposing the first and second delimiter information one on top of the other. In this case, if the first delimiter information exists in the arbitrary interval, the apparatus rejects the first delimiter information.

10 Claims, 17 Drawing Sheets

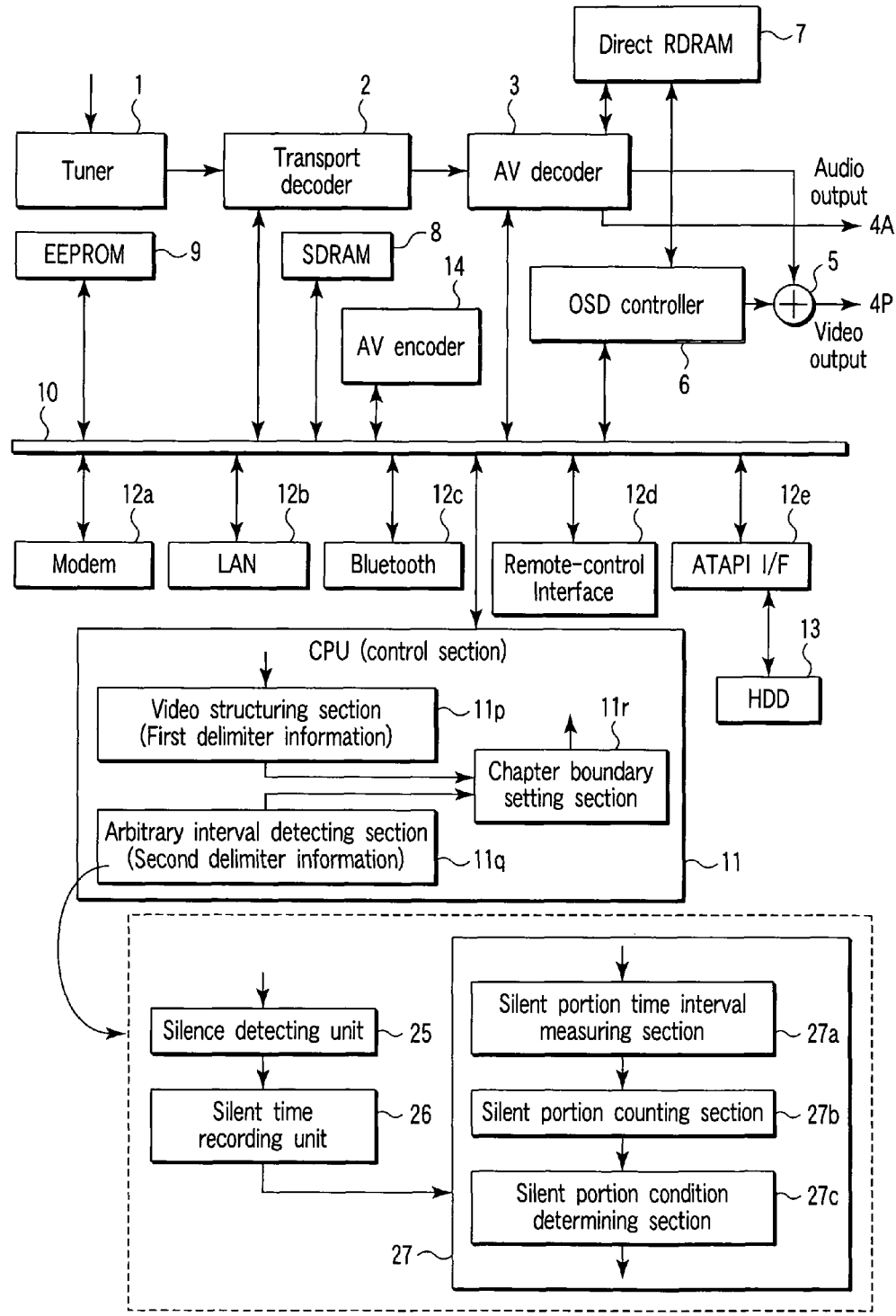
F I G. 1

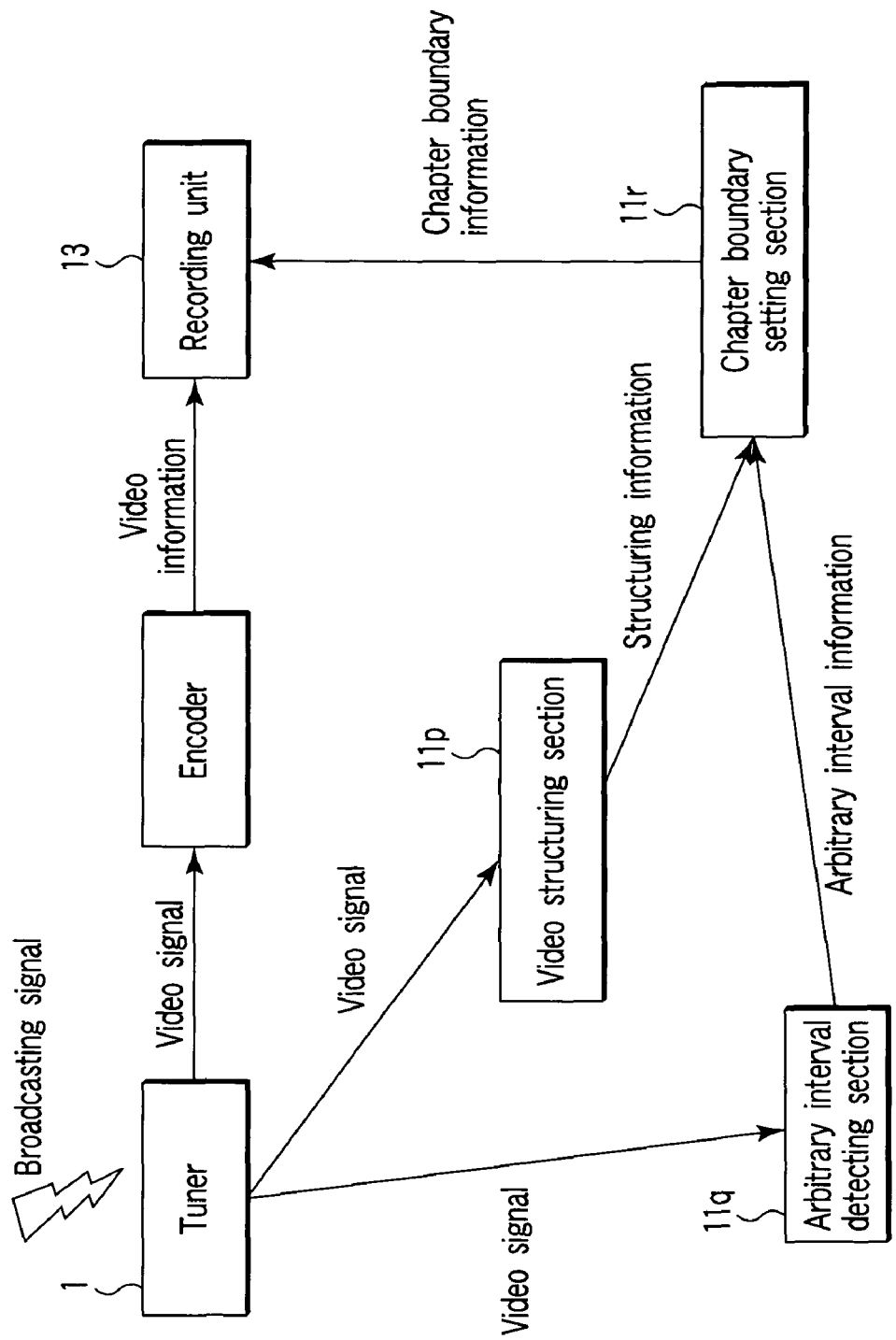
F I G. 2

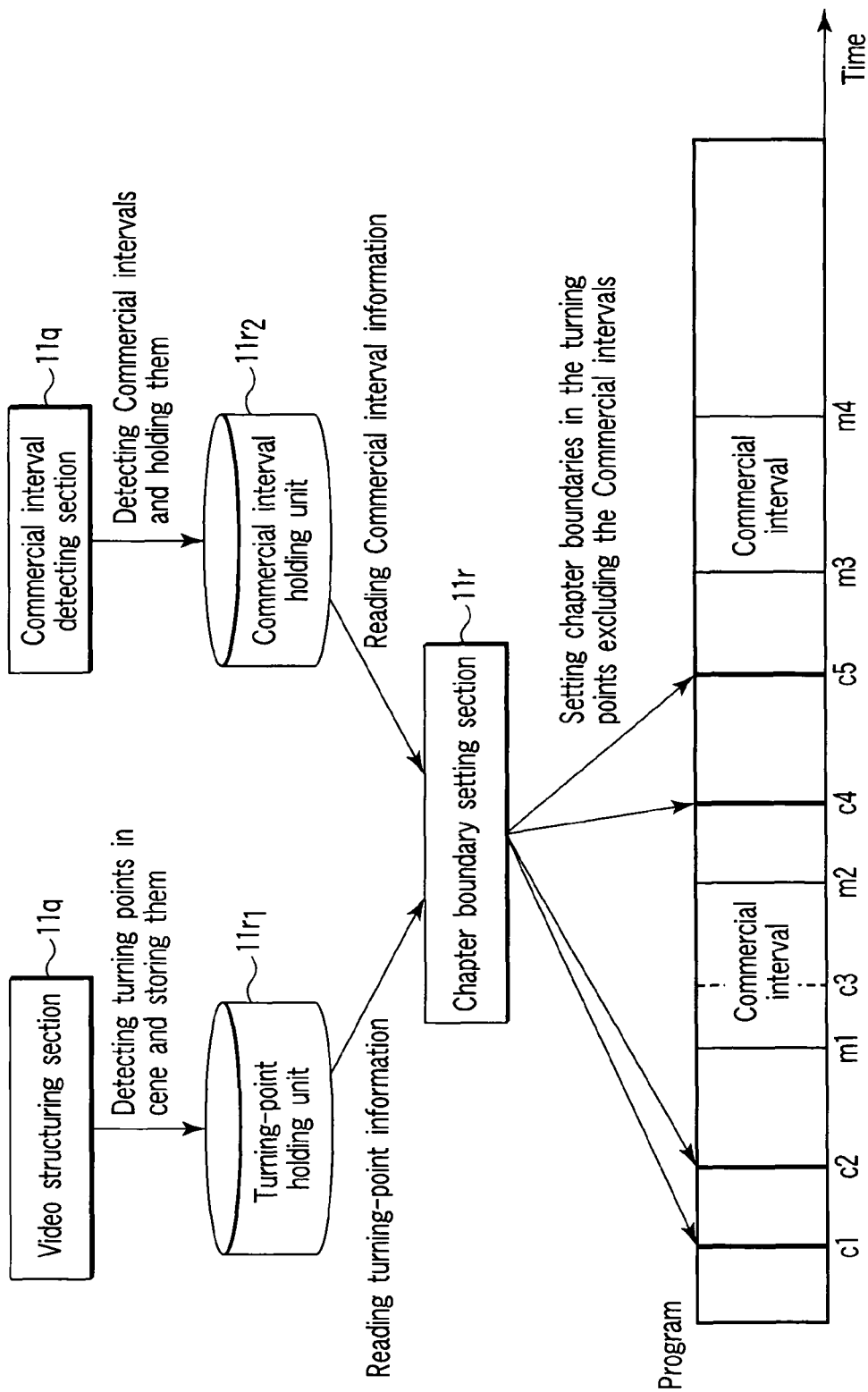
F I G. 5

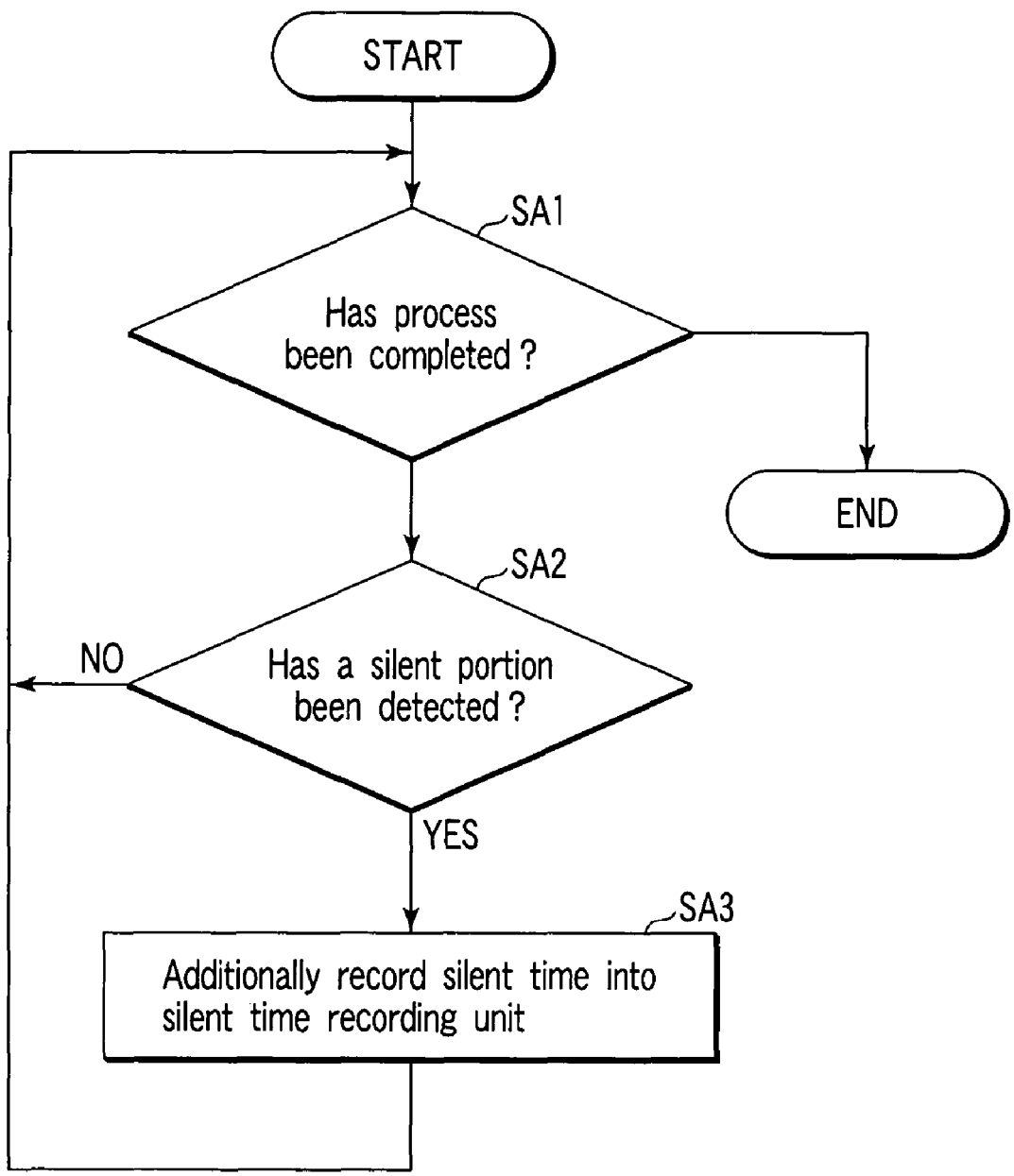
F I G. 12

METHOD OF AND APPARATUS FOR SETTING VIDEO SIGNAL DELIMITER INFORMATION JUDGED FROM AUDIO AND VIDEO SIGNALS

CROSS-REFERENCE TO RELATED APPLICATIONS

This application is based upon and claims the benefit of priority from Japanese Patent Application No. 2005-144191, filed May 17, 2005, the entire contents of which are incorporated herein by reference.

BACKGROUND

1. Field

One embodiment of the invention relates to a method of and apparatus for setting video signal delimiter information judged from audio and video signals to achieve video structuring. The method and apparatus are used in, for example, making chapter division to realize video structuring, while capturing the characteristics of video and audio signals.

2. Description of the Related Art

In a television broadcasting signal, a commercial break is usually provided at the boundary between programs or in the middle of a program. One known apparatus detects candidate intervals for the commercial portion in the audio mode (as disclosed in, for example, Jpn. Pat. Appln. KOKAI Publication No. 2000-354225). Another known apparatus detects a silent period, regardless of the audio mode, and sets delimiter information in a specific position in the silent period (as disclosed in, for example, Jpn. Pat. Appln. KOKAI Publication No. 2003-047031). If there are silent periods 15 seconds apart, they are determined to be commercial periods. Moreover, one known technique is to detect change points in video information and set chapter division points.

In the conventional technique, when chapter division points are set on the basis of analysis information only on video signals, chapter division points may appear in a commercial interval, particularly in an interval where commercials for a plurality of sponsors are broadcast consecutively.

Furthermore, when the time during which the audio mode (or stereo mode) is on is determined to be a commercial period, when the stereo-mode sound is present in the main story excluding the commercial periods, or when the stereo and monaural modes are mixed, it is impossible to distinguish only the commercial periods accurately. Moreover, the apparatus for detecting silent periods and creating delimiter information depends on the detecting accuracy of silent portions.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 shows an overall configuration of a signal processing apparatus to help explain an embodiment of the present invention;

FIG. 2 shows a basic configuration of the embodiment;

FIG. 5 is a diagram to help explain an example of the basic operation of still another embodiment of the present invention;

FIG. 12 is a flowchart to help explain a basic operation carried out in the apparatus of FIG. 10;

DETAILED DESCRIPTION

Figure 3:
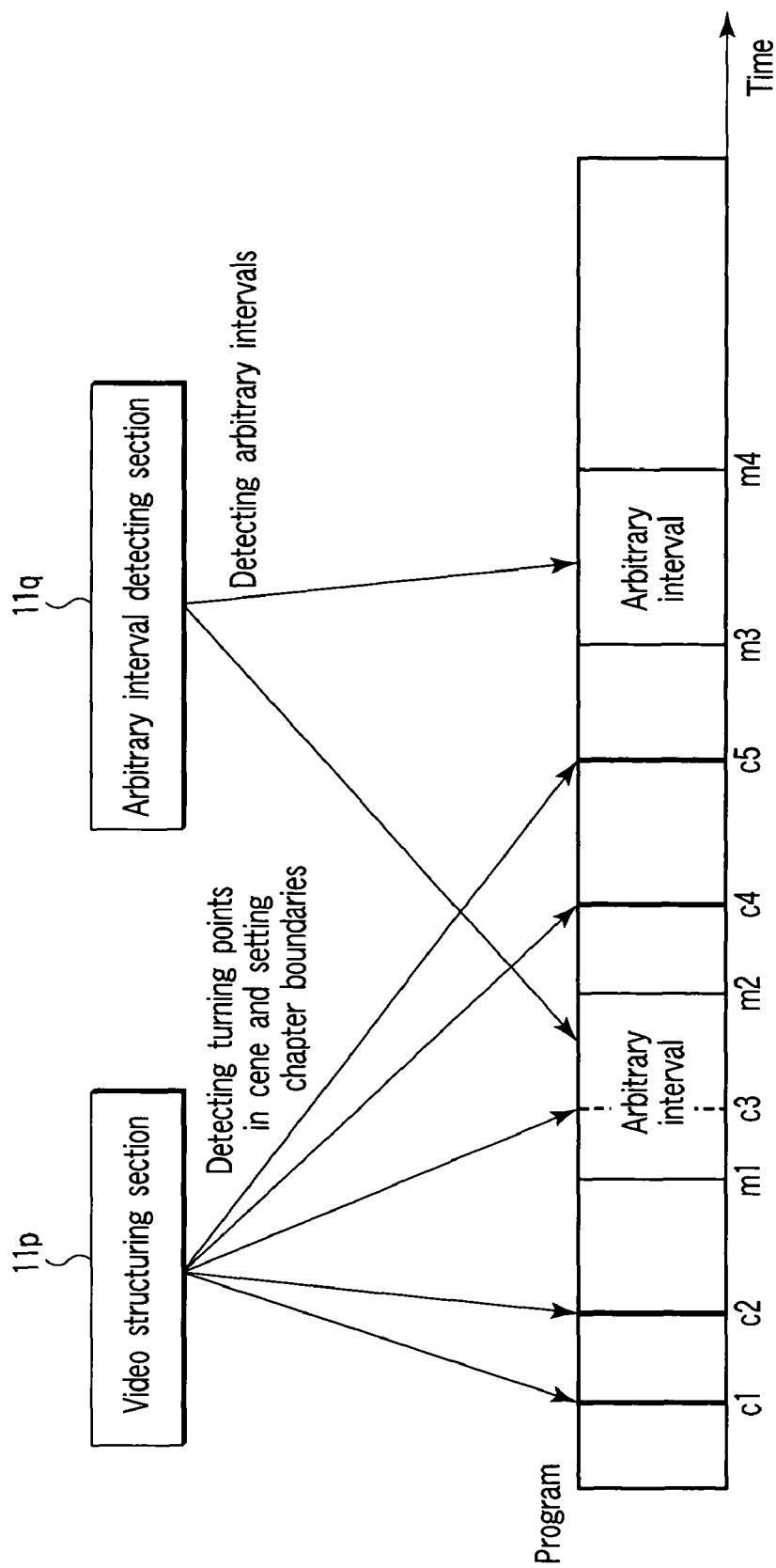
FIG. 3 is a diagram to help explain an example of the basic operation of the embodiment.

Various embodiments according to the invention will be described hereinafter with reference to the accompanying drawings. FIG. 1 shows the configuration of a flat-panel video display apparatus to which the present invention is applied.

In an embodiment of the invention, when there are a plurality of scene changes in an arbitrary (e.g., commercial) interval, even if a plurality of audio modes are mixed in a program, there is no need to chapter-divide the arbitrary (commercial) interval and optimum delimiter information for the main story can be obtained.

The embodiment is an apparatus which obtain first delimiter information by analyzing the similarity between consecutive frames in a video signal and providing delimitation according to the schematic content of the video signal. This apparatus includes a control section which analyzes an audio signal. The control section detects not only silent portions in an audio signal but also an interval where the time interval between a silent portion and the next silent portion and the count of the detected silent portions satisfy specific conditions and creates second delimiter information for the first and last silent portions. Then, the control section not only obtains third delimiter information by superimposing the first and second delimiter information one on top of the other but also do not adopt the first delimiter information if the first delimiter information exists between the second delimiter information given to the first silent portion and the one given to the last silent portion.

As described above, when delimiter information (or chapter division points) is set in a video signal, even if there are a plurality of similar scenes mixed in a program, it is possible to set appropriate delimiter information for the main story by obtaining conclusive delimiter information from a plurality of pieces of analysis information (or analysis information on an audio signal and a video signal).

FIG. 1 shows a configuration of a signal processing apparatus to which the present invention has been applied. The signal processing apparatus can be applied to, for example, a television receiving apparatus or an information recording and reproducing apparatus.

A tuner 1 receives, for example, a digital broadcasting signal, demodulates the received signal, and supplies the demodulated output to a transport decoder 2. The video and audio signals of a program selected by the transport decoder 2 are input packet by packet to an audio-video (AV) decoder 3, which demodulates the signals. The audio output demodulated at the AV decoder 3 is output to an output terminal 4A and the video output is output to an output terminal 4P. The video signal at the output terminal 4P may be combined with the video signal from an on-screen display (OSD) controller 6 at a composite circuit 51

A direct RDRAM 7 is used to store the data from the AV decoder 3 or an OSD controller 6 temporarily. An SDRAM 8 is used to store data temporarily in carrying out, for example, the process of correcting errors in the received signal. An EEPROM 9 is used to store, for example, programs for implementing the functions of the apparatus or parameters.

Numeral 10 indicates a main bus, which is connected to the transport decoder 2, AV decoder 3, OSD controller 6, SDRAM 8, and EEPROM 9. A CPU 11 acting as a control section which supervises the apparatus is connected to the main bus 10. Moreover, the apparatus can connect to an external unit via the bus 10. To do this, a modem interface 12a, a LAN terminal 12b, a Bluetooth interface 12c, a remote-control interface 12d, and an ATAPI interface 12e are connected to the main bus 10. A hard disk drive 13 may be connected via the interface 12e to the main bus 10. Further connected to the main bus 10 is an AV encoder 14 which converts a video signal into a signal with a specific format (e.g., a format conforming to the DVD standard) for recording on a recording medium.

In the CPU 11, there are provided a video structuring section 1ip (or referred to as a magic chapter division function), an arbitrary interval detecting section 11q (or referred to as a main-story automatic chapter division function), and a chapter boundary setting section 11r.

The video structuring section 11p can obtain first delimiter information by analyzing the similarity between consecutive frames of a video signal and providing delimitation according to the schematic content of the video signal. The first delimiter information (or chapter division points) is input to the chapter boundary setting section 11r. The arbitrary interval detecting section 11q detects silent portions in an audio signal and determines whether the time interval between a silent portion and the next silent portion is a multiple of a specific time (A). If the time interval is a multiple of the specific time (A), the arbitrary interval detecting section 11q counts the number of times a silent portion is detected. If the count of the detected silent portions is equal to or larger than a threshold value (B), the arbitrary interval detecting section 11q can obtain second delimiter information (arbitrary interval information, audio interval information, or commercial interval information) for the first and last silent portions. The second delimiter information is also input to the chapter boundary setting section 11r. When the first delimiter information exists in an arbitrary interval set with the second delimiter information, the chapter boundary setting section 11r does not adopt the first delimiter information.

The arbitrary interval detecting section 11q includes a silence detecting unit 25. The silence detecting unit 25 determines a part where the audio level is equal to or lower than a threshold level for a specific time to be a silent portion and detects the portion. At this time, the silence detecting unit 25 outputs silence information to a silent time recording unit 26. The silent time recording unit 26 accumulates silent portion information (or information on the time at which a silent portion was determined) in a program. The silent time information recorded in the silent time recording unit 26 is processed at a silent portion interval computing unit 27. The silent portion interval computing unit 27 includes a silent portion time interval measuring section 27a that determines whether the time interval between a silent portion and the next silent portion is a multiple of a specific time (A) in further dividing the interval into blocks, a silent portion counting section 27b that counts the number of times a silent portion is detected if the time interval is a multiple of the specific time (A), and a silent portion condition determining section 27c that sets delimiter information in the silent portions appeared at the beginning and at the end if the count of silent portions is equal to or larger than a threshold value (B).

In FIG. 2, to make the explanation easier to understand, representative component elements of the characterizing part of the apparatus are shown. The parts corresponding to the component elements of FIG. 1 are indicated by the same reference numerals. The video signal (including the audio signal in this case) received and demodulated at the tuner 11 is input to the video structuring section 11p and arbitrary interval detecting section 11q. Then, the first delimiter information (or referred to as structuring information) and the second delimiter information (or referred to as arbitrary interval information) obtained at the respective processing sections are input to the chapter boundary setting section 11r. The chapter boundary setting section 11r obtains third delimiter information by superimposing the first and second delimiter information one on top of the other. The chapter boundary setting section 11r does not adopt the chapter division points that meet a specific condition and inserts the adopted chapter points into the management information in the recording unit 13.

FIG. 3 is a diagram to help explain an example of the operation of the main part of the apparatus. Suppose the video structuring section 11p has just detected the chapter division points c1, c2, . . . , c5 (or the first delimiter information) in the direction of the elapse of time in a program. On the other hand, suppose the arbitrary interval detecting section 11q has detected pieces of the second delimiter information m1, m2, m3, m4 in the direction of the elapse of time in the same program and has set an arbitrary interval between m1 and m2 and between m3 and m4.

Then, in an arbitrary interval (m1-m2), the delimiter information c3 detected by the video structuring section 11p exists. In this case, the apparatus does not adopt the delimiter information c3. This prevents a chapter division point from being added to an arbitrary interval (such as an interval where stereo sound is continuous). An arbitrary interval is, for example, an interval where the sound mode remains unchanged and is continuous, an interval where the stereo mode is continuous, or an interval where an audio frequency in a specific band is continuous.

Figure 4:
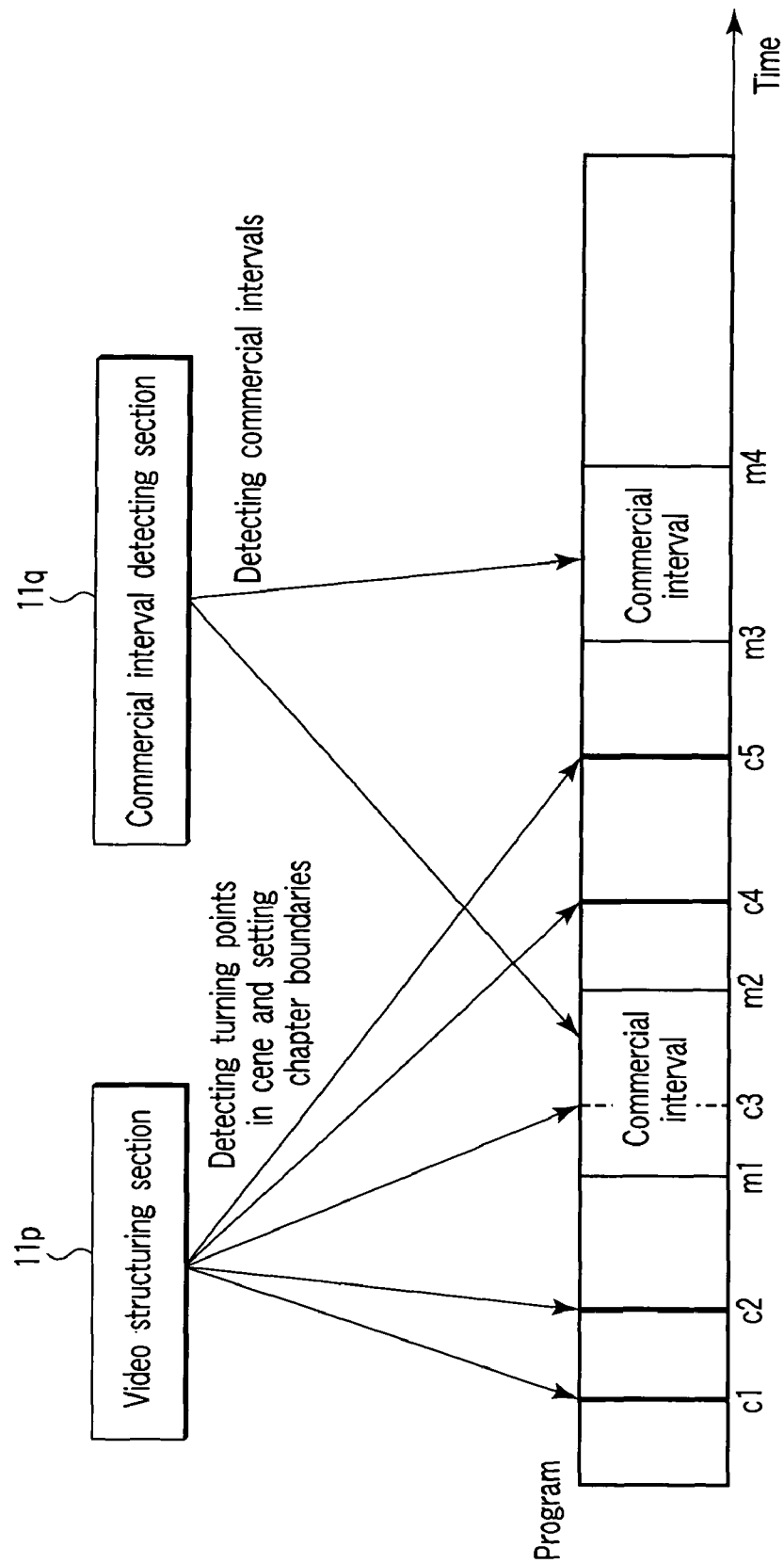
FIG. 4 is a diagram to help explain an example of the basic operation of another embodiment of the present invention.

FIG. 4 shows still another embodiment of the present invention. What differs from the example of FIG. 3 is that the arbitrary interval detecting section 11q is used to detect a commercial interval. In this case, too, suppose, for example, the interval m1-m2 and the interval m3-m4 have been detected as commercial intervals. Then, suppose the delimiter information c3 detected by the video structuring section 11p exists in the commercial interval (m1-m2). In this case, the apparatus does not adopt the delimiter information c3. This prevents a chapter division point from being set in the commercial interval.

FIG. 5 shows still another embodiment of the present invention. What differs from the example of FIGS. 3 and 4 is that there are provided a holding unit 11r1 that holds first delimiter information temporarily and a holding unit 11r2 that holds second delimiter information temporarily. The chapter boundary setting section 11r generates a chapter division point using first delimiter information (e.g., turning-point information serving as a chapter division point) and second delimiter information (e.g., commercial interval information) from the holding units 11r1 and 11r2. In this case, too, the apparatus does not adopt the delimiter information c3 present in the commercial interval (m1-m2).

As described above, the apparatus has the holding units 11r1, 11r2, a chapter division point can be set when video information is reproduced from the recording medium. In the examples of FIGS. 3 and 4, it was necessary to detect delimiter information in real time and set chapter division points on a program basis. In the example of FIG. 5, however, after programs are recorded onto a recording medium temporarily, chapter division points can be set in a desired program.

Figure 6:
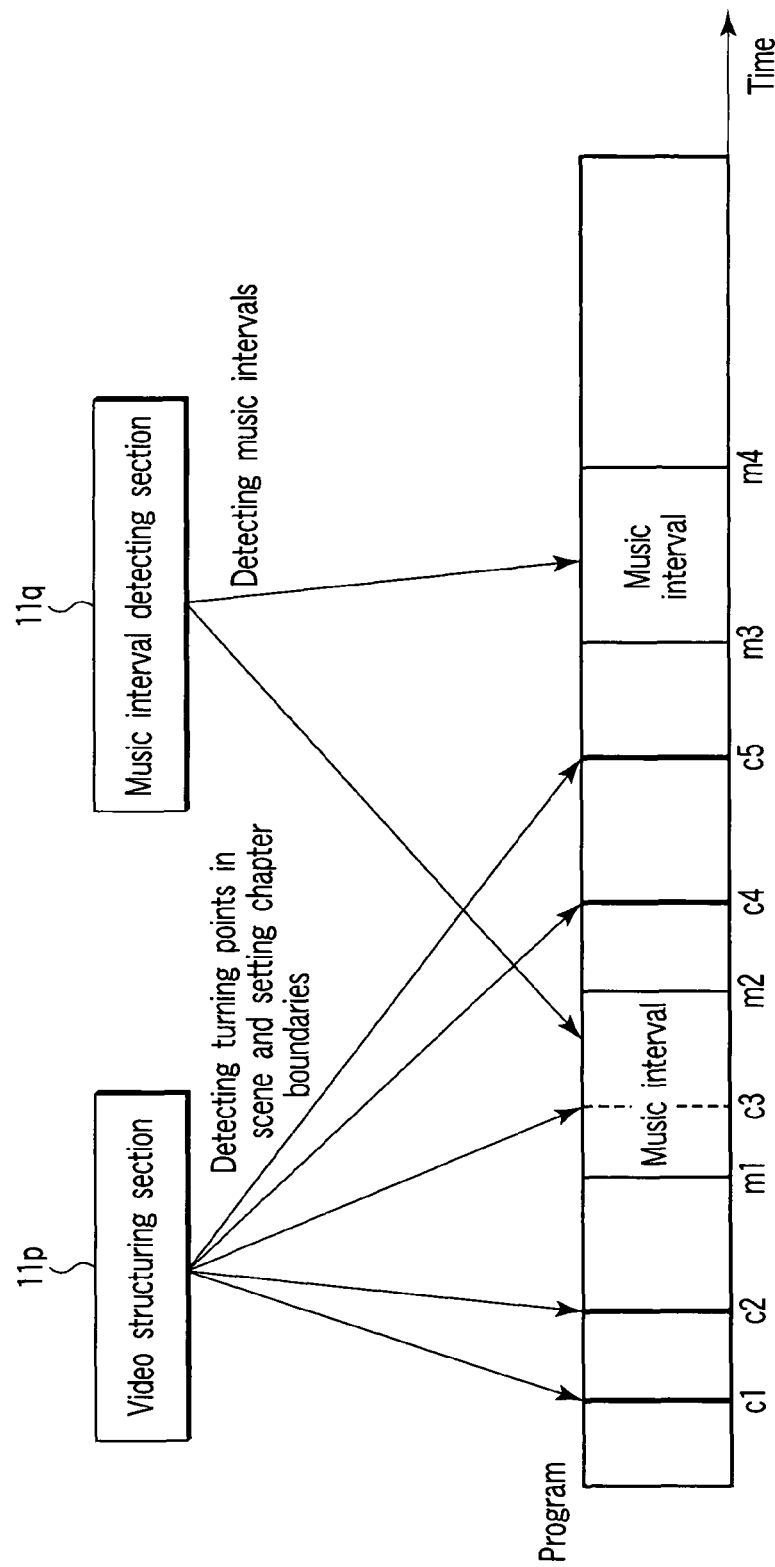
FIG. 6 is a diagram to help explain an example of the basic operation of still another embodiment of the present invention.

FIG. 6 shows still another embodiment of the present invention. What differs from the example of FIGS. 3 and 4 is that the arbitrary interval detecting section 11q is used to detect a music interval. In this case, too, suppose, for example, the interval m1-m2 and the interval m3-m4 have been detected as music intervals. Then, suppose the delimiter information c3 detected by the video structuring section 11p exists in the music interval (m1-m2). In such a case, the apparatus does not adopt the delimiter information c3. This prevents a chapter division point from being set in the music interval.

Figure 7:
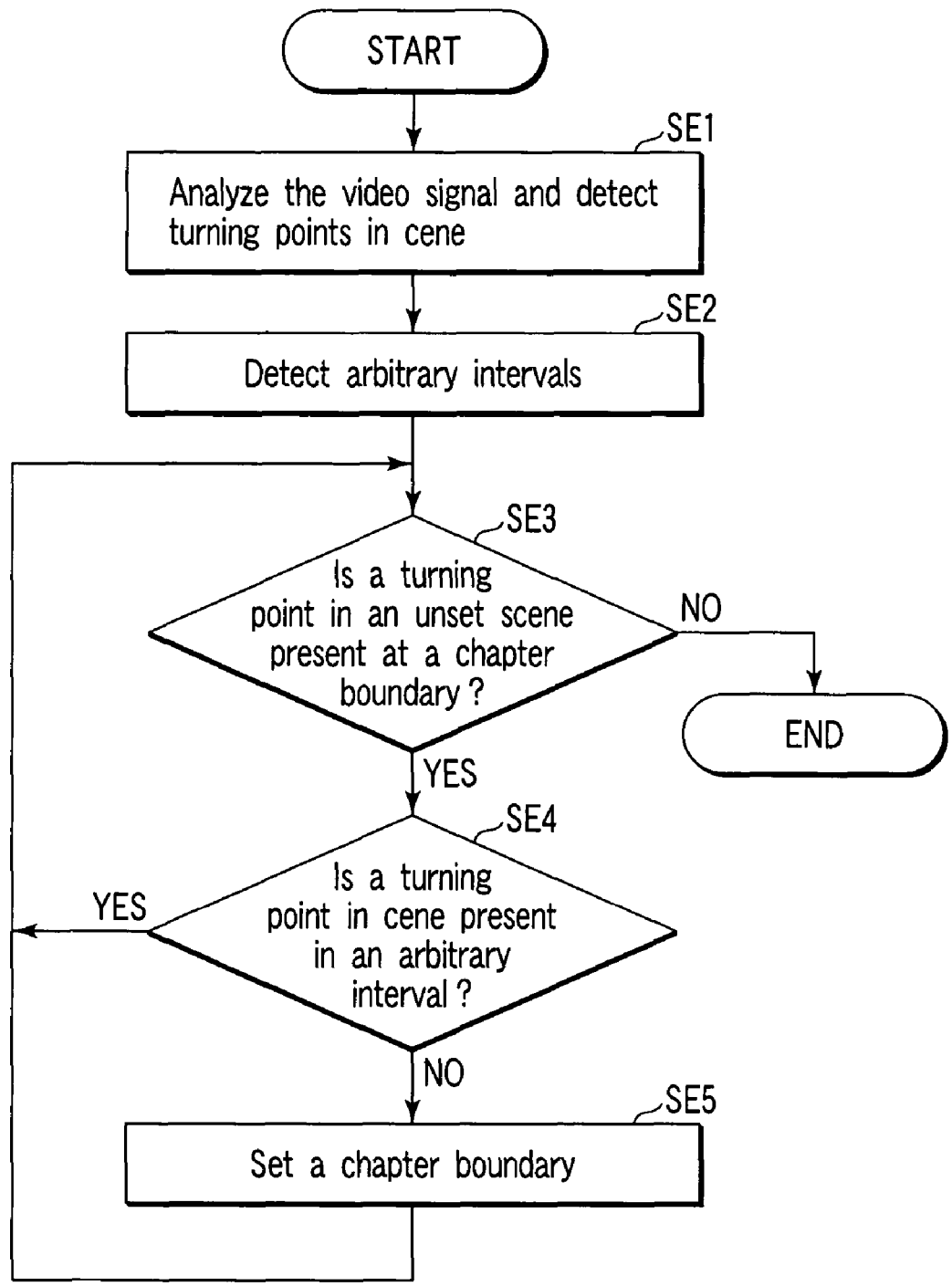
FIG. 7 is a flowchart to help explain a basic operation in an embodiment of the present invention.

FIG. 7 is a flowchart to help explain the operation of the main part of the apparatus. When the process is started, the video structuring section 11p analyzes the video signal, detects, for example, a turning point of the scene, and registers the point as a chapter division point in a memory temporarily (block SE1). Next, the arbitrary interval detecting section 11q analyzes the audio signal, detects an arbitrary interval, and registers arbitrary interval information in a memory temporarily (block SE2). Then, it is determined whether a chapter division point (e.g., a turning point in the scene) has been detected (block SE3). If a chapter division point (e.g., a turning point in the scene) has not been detected, the process is ended. If a chapter division point has been detected, control proceeds to the next block. Then, as explained the various examples in FIGS. 3 to 6, if a division point exists in an arbitrary interval, this division point is ignored and another division point is set as a chapter boundary (blocks SE4 and SE5).

Figure 8:
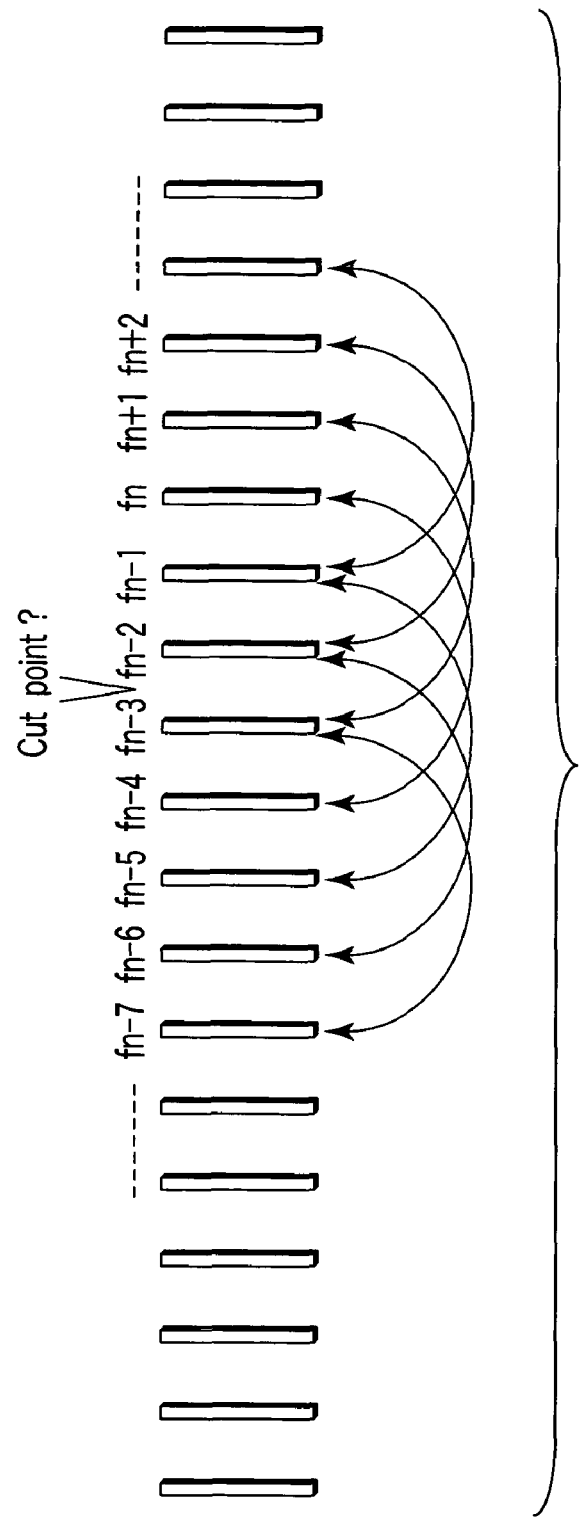
FIG. 8 is a diagram to help explain a basic processing structure of a video structuring process related to the embodiment.
Figure 9:
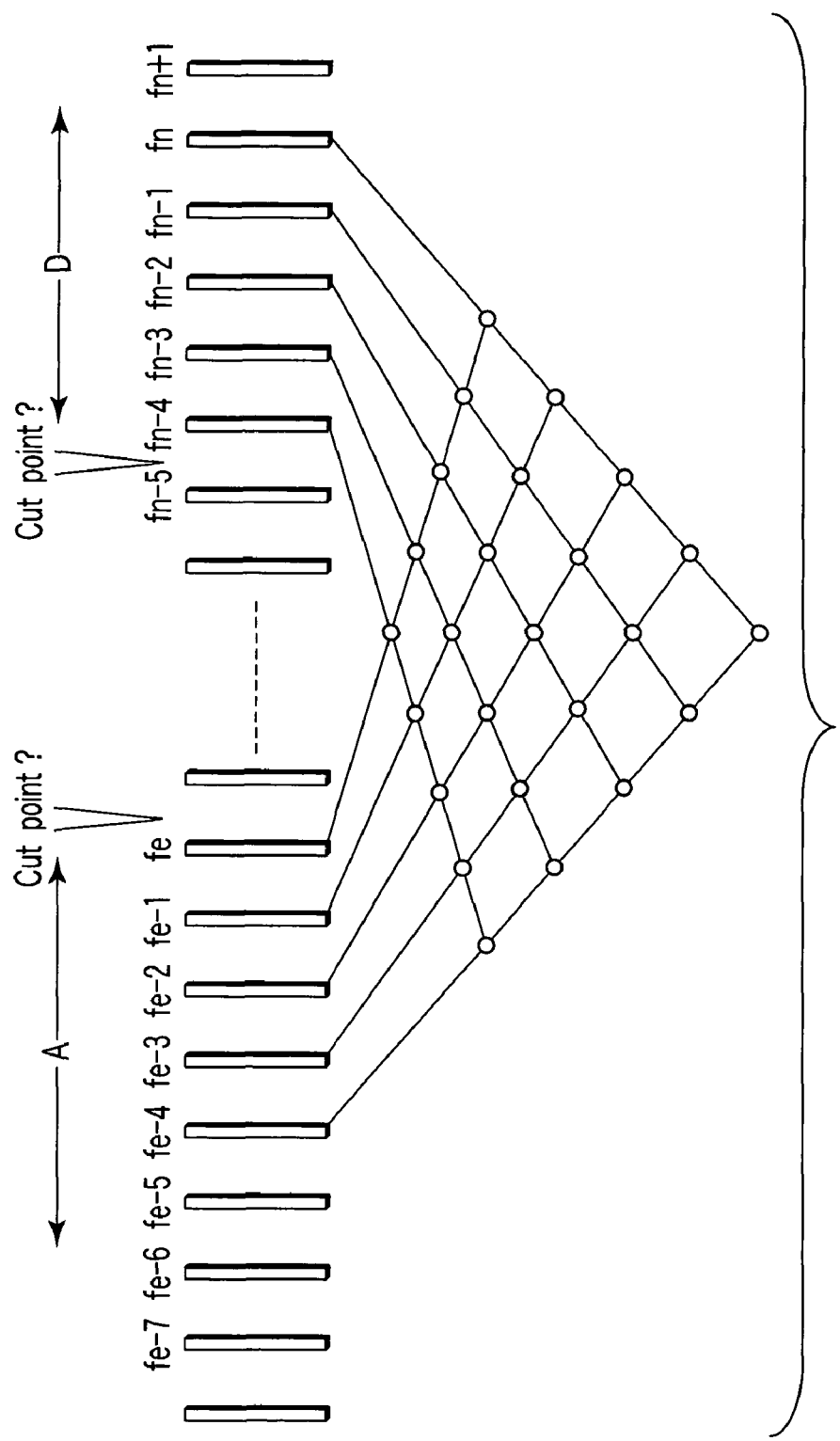
FIG. 9 is a diagram to help explain the basic processing structure of the video structuring process related to the embodiment, continued from FIG. 8.

FIGS. 8 and 9 are diagrams to help explain a representative operation of the video structuring section 11p. The process carried out here is referred to as, for example, a function based on "magic chapter division." This function is to analyze mostly video data and determine the similarities of fields or frames. It is a method of detecting cuts, determining similar shots, calculating the number of dialogues, and determining chapter boundaries. The spacing between cut points is called a shot.

In "detecting cuts," an I picture and another I picture (or frames separated at intervals of 0.5 second) are compared with one another. If the hue of the entire screen differs greatly or the number of areas where brightness variation is great is larger than a preset parameter, the frames are determined to be dissimilar to one another. The points determined to be dissimilar may be referred to as turning points.

Then, frames separated at intervals of 0.5 second are compared with one another sequentially. If there is an interval where the number of groups of dissimilar frames is equal to or larger than a threshold value, a cut point is set at an arbitrary point in the interval. FIG. 8 shows the way the similarity between frames indicated by arrows is determined. In a part where there are many groups of dissimilar frames, a cut point is set. In FIG. 8, fn, fn-1, fn-2, . . . , fe, fe-1, fe-2, . . . indicate frames.

In "detecting similar shots," the similarity between several frames going back from a past cut point and several frames after the most recent cut point is determined in a round-robin manner. FIG. 9 shows the way the similarity is determined in a round-robin manner. If the number of groups of frames determined to be "similar" is equal to or larger than a threshold value, the two shots are determined to be similar. That is, as shown in FIG. 9, it is determined whether the frames between shot A in front of a cut point and shot D behind a cut point are similar to one another. In the example of FIG. 9, for example, there are as many similarity determinations as there are places marked with a circle.

"Detection of dialogs" and "the number of dialogs" are defined as follows. (a) An interval (or part) where similar shots appear intensively is a meaningful interval. (b) The index "the number of dialogs" is introduced to quantify the density at which similar shot appear. "The number of dialogs" becomes larger as the following conditions are satisfied: (b1) many shots are included (=cut points appear frequently); (b2) the number of shots contributing (=similar) to dialogs is large; and (b3) the total time of shots contributing (=similar) to dialogs is long.

On the basis of (c) the number of dialogues, a dialogue interval is calculated. Then, (d) adjacent dialogue intervals are connected to one another.

The "magic chapter division" function is basically carried out by the above processes. When cut points are set and similar shots are detected, these may be realized sufficiently by the above processes. However, to add the function of restructuring a plurality of program structures, the following functions may be additionally included.

They are a "news-program-specific processing" function and an "other-programs processing" function.

The "news-program-specific processing" function is to detect begin shots of the topic and suppose a similar shot distributed in a program to some extent, having some length, and appearing more than a certain number of times to be a "begin shot of the topic." When "begin shots of the topic" are consecutive, the last one of the consecutive begin shots is determined to be a true "begin shot of the topic" and the others are determined to be a "follow-up for the preceding topic." The "other-programs processing" function is to set a "corner title detecting" function. This function is to determine a similar shot distributed widely in a program, belonging to no dialog interval, and appearing more than a certain number of times to be a "corner title." If no corner title appears even a while after the start of a program, the program is regarded as a "program with no corner title."

As described above, once information on program cut points, information on similar shots, information on the beginning of the topic of a news program, and information on the corner titles of the other programs have been obtained, when a program is edited or when the chapters for a program are structured, they can be used as useful information.

FIGS. 10 to 14 are diagrams to help explain a concrete example of the arbitrary interval detecting section 11q.

Figure 10:
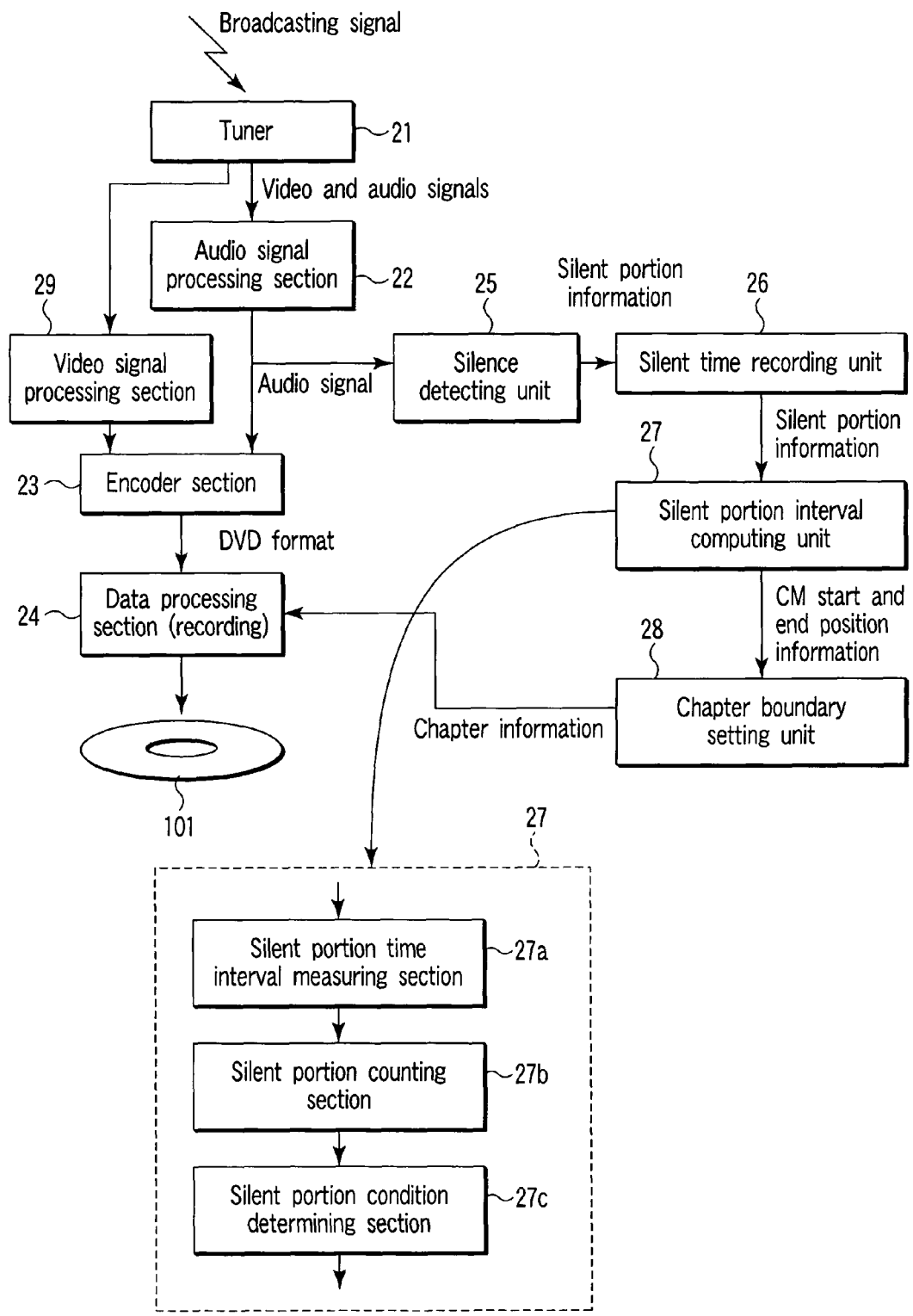
FIG. 10 is a diagram to help explain a basis processing structure of an arbitrary interval detecting process related to the embodiment.

In FIG. 10, a broadcasting signal is received at a tuner 21. The tuner 21 outputs the video and audio signals of a program on the selected channel. The audio signal is demodulated and decoded at an audio signal processing section 22. The output of the audio signal processing section 22 is supplied to an encoder 23 and a silence detecting unit 25 explained later.

On the basis of the DVD standard, the encoder section 23 encodes the video signal and audio signal into signals with specific formats and outputs the resulting signals to a data processing section 24. The data processing section 24 is capable of modulating and recording information onto a hard disk, DVD-R, DVD-RW, or DVD-RAM. Moreover, the data processing section 24 is capable of demodulating the information read from the disk. In addition, the data processing section 24 includes the function of processing error correction code (ECC).

The output of the audio signal processing section 22 is also supplied to the silence detecting unit 25. The silence detecting unit 25 detects, as a silent portion, a part where the audio level is equal to or lower than a threshold value for a specific time. At this time, the silence detecting unit 25 outputs silence information to a silent time recording unit 26. That is, the silent time recording unit 26 accumulates silent portion information (or information on the time when a silent portion was determined) in the program.

The silent time information recorded in the silent time recording unit 26 is used at a silent portion interval computing unit 27. The silent portion interval computing unit 27 determines whether the time interval between a silent portion and the next silent portion is a multiple of a specific time (A). If the time interval is a multiple of the specific time (A), the silent portion interval computing section 27 counts silent portions. If the count of silent portions is equal to or larger than a threshold value (B), the silent portion interval computing section 27 sets chapter delimiter information in the silent portion appeared at the beginning as commercial start information and in the silent portion appeared at the end as commercial end information and supplies these pieces of information to a chapter boundary setting unit 28.

The chapter boundary setting unit 28 then creates chapter information and supplies the information to the data processing section 24. The data processing section 24 converts the chapter information into an entry point in management information complying with the DVD standard and manages the data.

Video information is processed at a video signal processing section 29 and is input to the encoder section 23, which converts the input signal into specific data conforming to the DVD standard. Then, the output of the encoder section 23 is recorded onto an optical disk 101 via the data processing section 24.

Here, the silent portion interval computing section 27 further includes a silent portion time interval measuring section 27a that determines whether the time interval between a silent portion and the next silent portion is a multiple of a specific time (A) in further dividing the interval into blocks, a silent portion counting section 27b that counts silent portions if the time interval is a multiple of the specific time (A), and a silent portion condition determining section 27c that sets delimiter information in the silent portions appeared at the beginning and at the end if the count of silent portions is equal to or larger than a threshold value (B).

Figure 11:
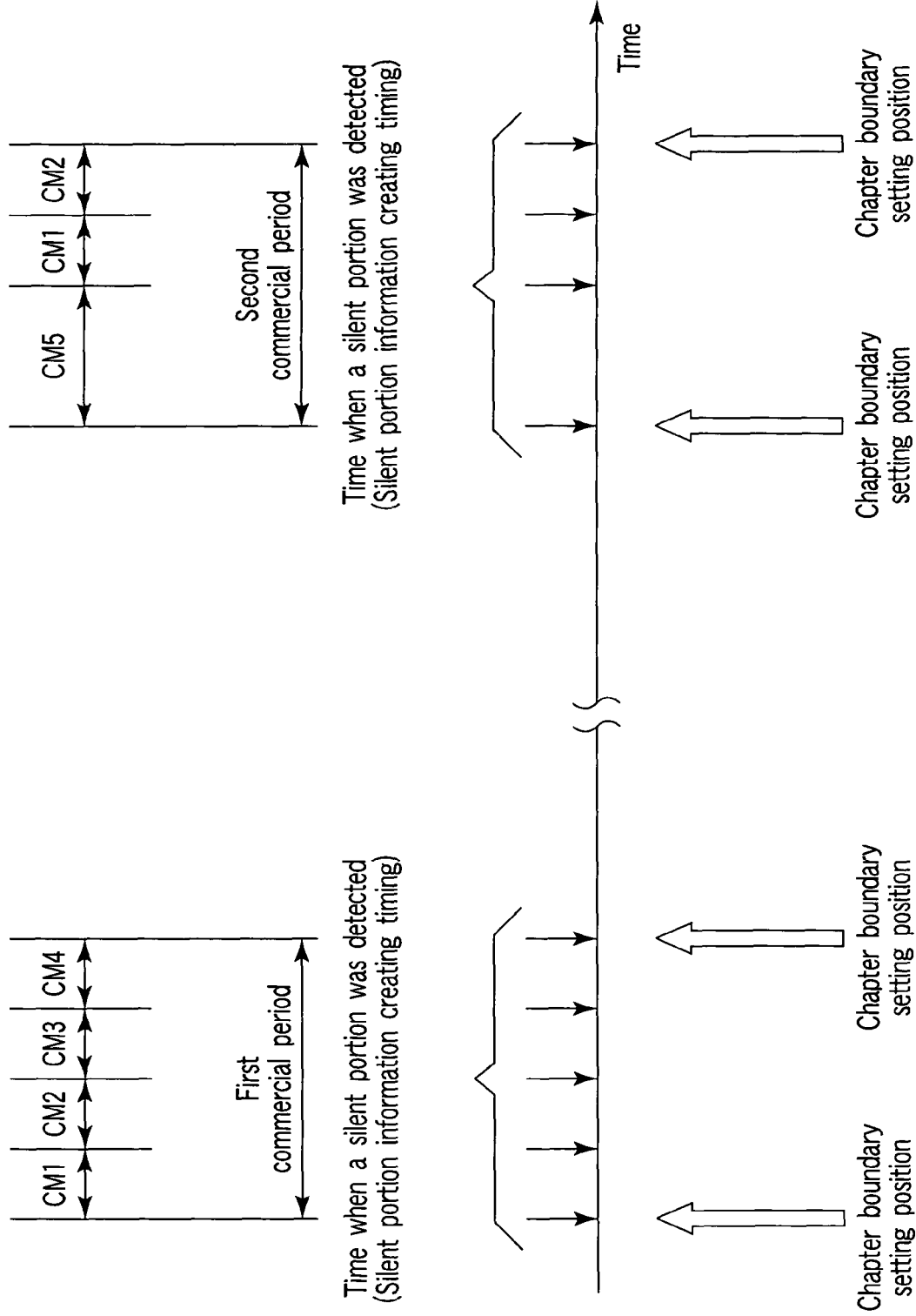
FIG. 11 is a timing chart to help explain an operation carried out in the apparatus of FIG. 10.

FIG. 11 shows on the time axis the time at which a silent portion was detected by the silence detecting unit 25, silent time storage unit 26, silent portion interval computing unit 27, and chapter boundary setting unit 28 and the time at which chapter information was obtained to set a chapter boundary. To make the explanation easer to understand, simplification is used. FIG. 11 shows a case where there are two commercial periods in one program (e.g., a program scheduled to be recorded).

Specifically, FIG. 11 shows a case where in a first commercial period, four commercials, CM1, CM2, CM3, and CM4, were broadcast, and in a second commercial period, three commercials, CM5, CM2, and CM3, were broadcast.

For example, in the first commercial period, since there are silent periods in the delimiter potions of each commercial, silent portion detecting flags are obtained. However, after CM4, since a condition explained later is not satisfied, the end of CM4 is determined to be a chapter boundary position. Moreover, the position of the silent portion detecting flag immediately before the start of the first CM1 is set as a chapter boundary. That is, flags indicating chapter boundaries are obtained before and after a commercial period. Similarly, in the second commercial period, too, chapter boundaries are not set in all of the silent portions, but a plurality of commercials (broadcast consecutively) satisfying a specific condition are grouped together and a chapter boundary is set using a group as a unit.

FIG. 12 shows the steps of carrying out the above processes in large blocks. It is determined whether the process of setting a chapter in one program has been completed (block SA1). If the process has not been completed, a silence detecting process is carried out to detect a silent portion (block SA2). If a silent portion has been detected, the time at which the silent portion was detected is stored as described above (block SA3). When management information is processed at the end of the program, a chapter boundary is set as an entry point in the management information as explained in FIG. 2.

Figure 13:
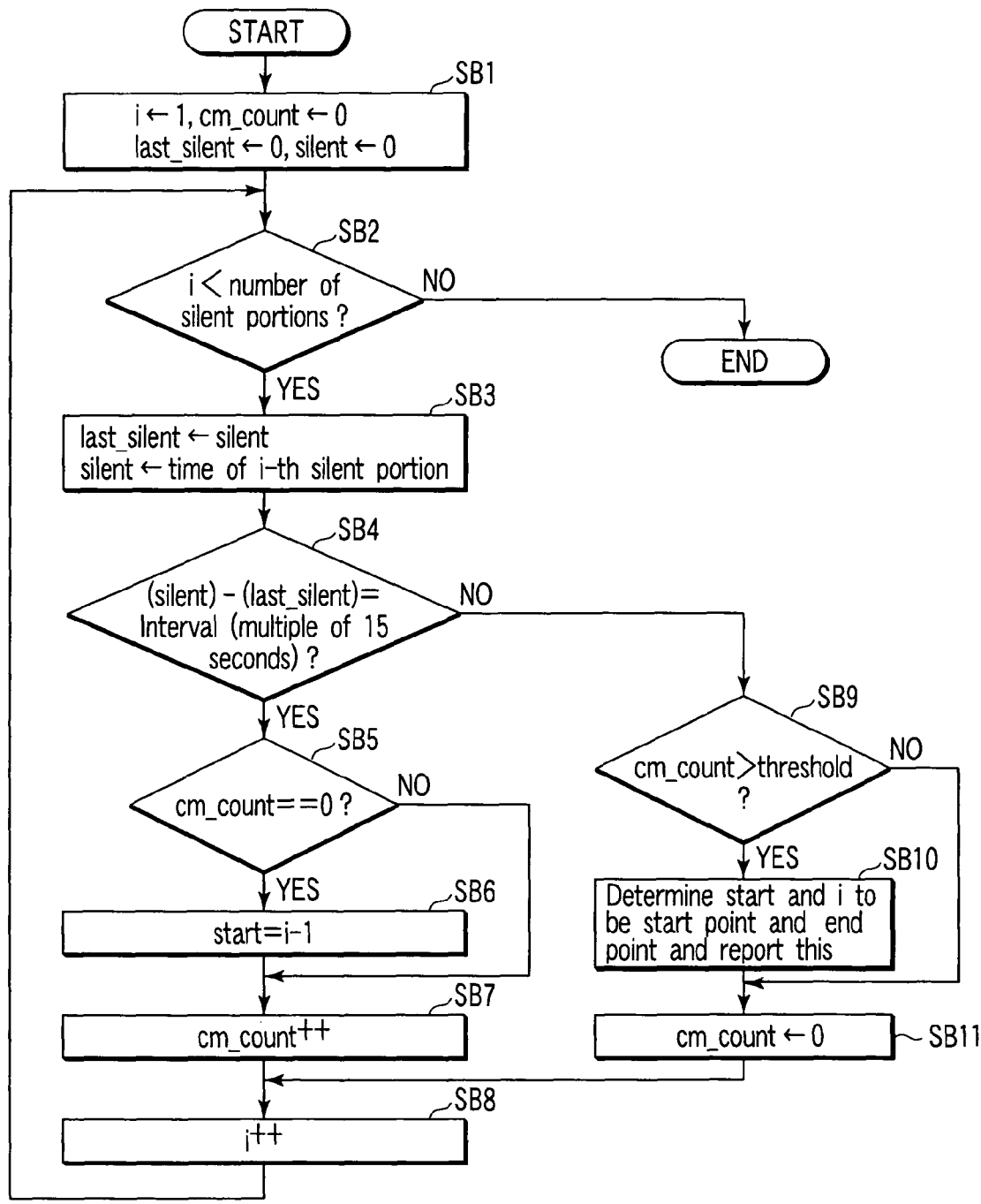
FIG. 13 is a flowchart to help explain in more detail a basic operation carried out in the apparatus of FIG. 10.

FIG. 13 is a flowchart to help explain the way a chapter boundary for the commercial start point and a chapter boundary for the commercial end point are determined when silent portions are detected one after another in a commercial period. After the process starts, when a silent portion is detected, i is used as information indicating a number in the order of silent portions. When the first silent portion is detected, then i←1, commercial count value (cm_count) is set as cm_count←0, the time of the last silent portion (last_silent) is set as last_silent←0, and the time at which a silent portion was detected is set as silent←0 (block SB1).

If the number of silent portions is smaller than i when a silent portion has been detected, the preceding time (silent) is set as last_silent←silent and the present time (silent) is determined to be the time of the i-th silent portion (blocks SB2, SB3). Next, (silent)−(last_silent) is calculated, thereby determining whether the value is a multiple of 15 seconds. The reason is that commercials are often broadcast in units of 15 seconds of in units of a multiple of 15 seconds.

It the value is 15 seconds (value A) or a multiple of 15 seconds, it is determined whether cm_count=0 is fulfilled (block SB5). If cm_count=0, It is immediately after the count of commercials is started. Since i−1 corresponds to the start time of a commercial, then start←i−1 in block SB6.

If in block SB5, cm_count≠0, this means that a commercial period has already started, control proceeds to block SB7, where cm_count is incremented by one. After block SB7, the process of (i+1) is carried out (block SB8) and control returns to block SB2.

In the preceding block SB4, the result of calculating (silent)−(last_silent) is not a multiple of 15 seconds (value A), it is regarded as not being a commercial period. At this time, control proceeds to block SB9, where it is determined whether cm_count accumulated up to now satisfies the expression cm_count>threshold value (B). If cm_count satisfies the expression, it is determined that a plurality of commercial groups have been broadcast. In this case, the start time and the time at which the present accumulated i was obtained are determined to be the commercial start point and the commercial end point respectively, which are then reported to the chapter boundary setting unit (block SB10). Thereafter, cm_count and i are set as cm_count=0 and i=0.

The specific time (value A) may be made variable. To make the value A variable, there is provided a special setting user guide menu. The threshold value (B) may have a specific margin.

Figure 14:
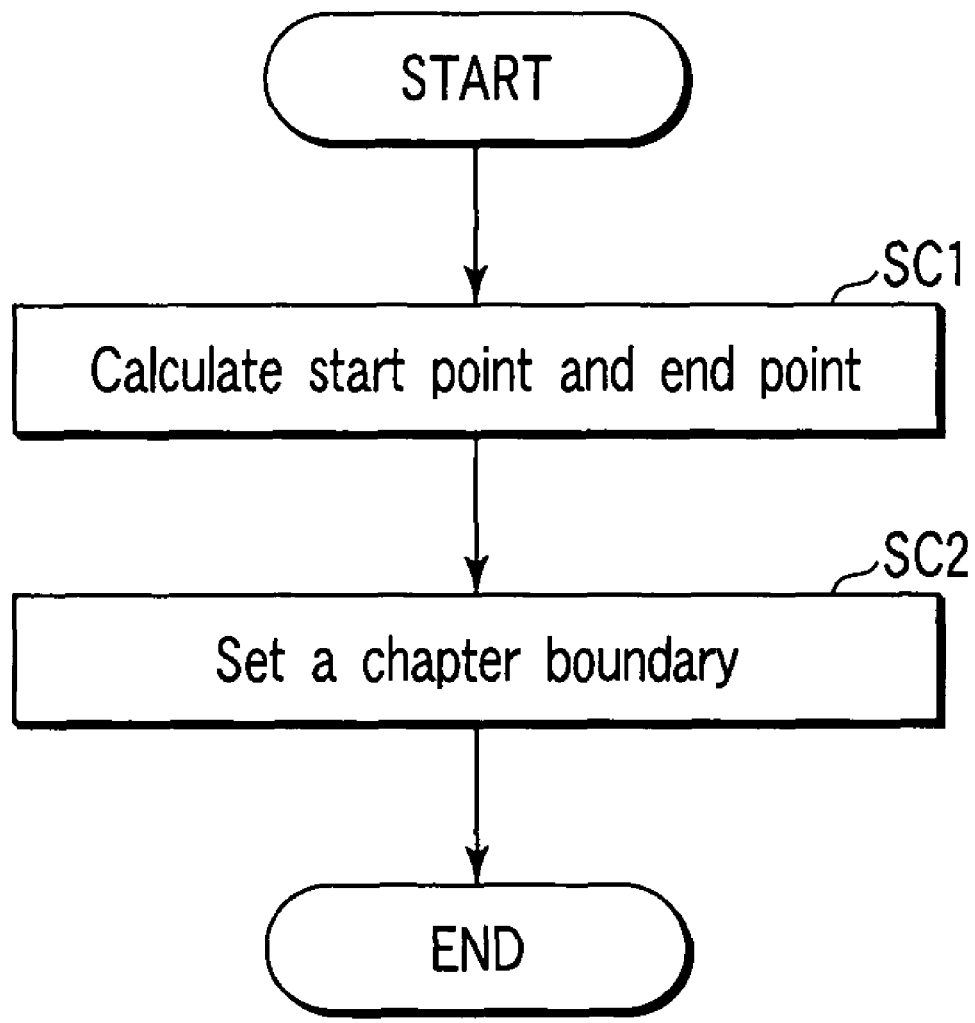
FIG. 14 is a flowchart to help explain a basic operation carried out in the apparatus of FIG. 10.

FIG. 14 helps explain the operation of the chapter boundary setting unit 28. The flowchart of FIG. 14 shows the procedure for acquiring information on the commercial start point and the commercial end point (block SC1) and setting a chapter boundary (block SC2).

With the above-described method and apparatus, all of the positions of the detected silent portions are not made chapter boundaries in a commercial broadcasting period, but the start position and end position of a plurality of consecutive commercials (consecutive commercial groups) are detected.

The user can set the turning on and off of the above function by selection. In this case, the user can select a detailed setting button on a program scheduling screen and further select the turning on and off, while looking at a detailed setting screen.

Figure 15:
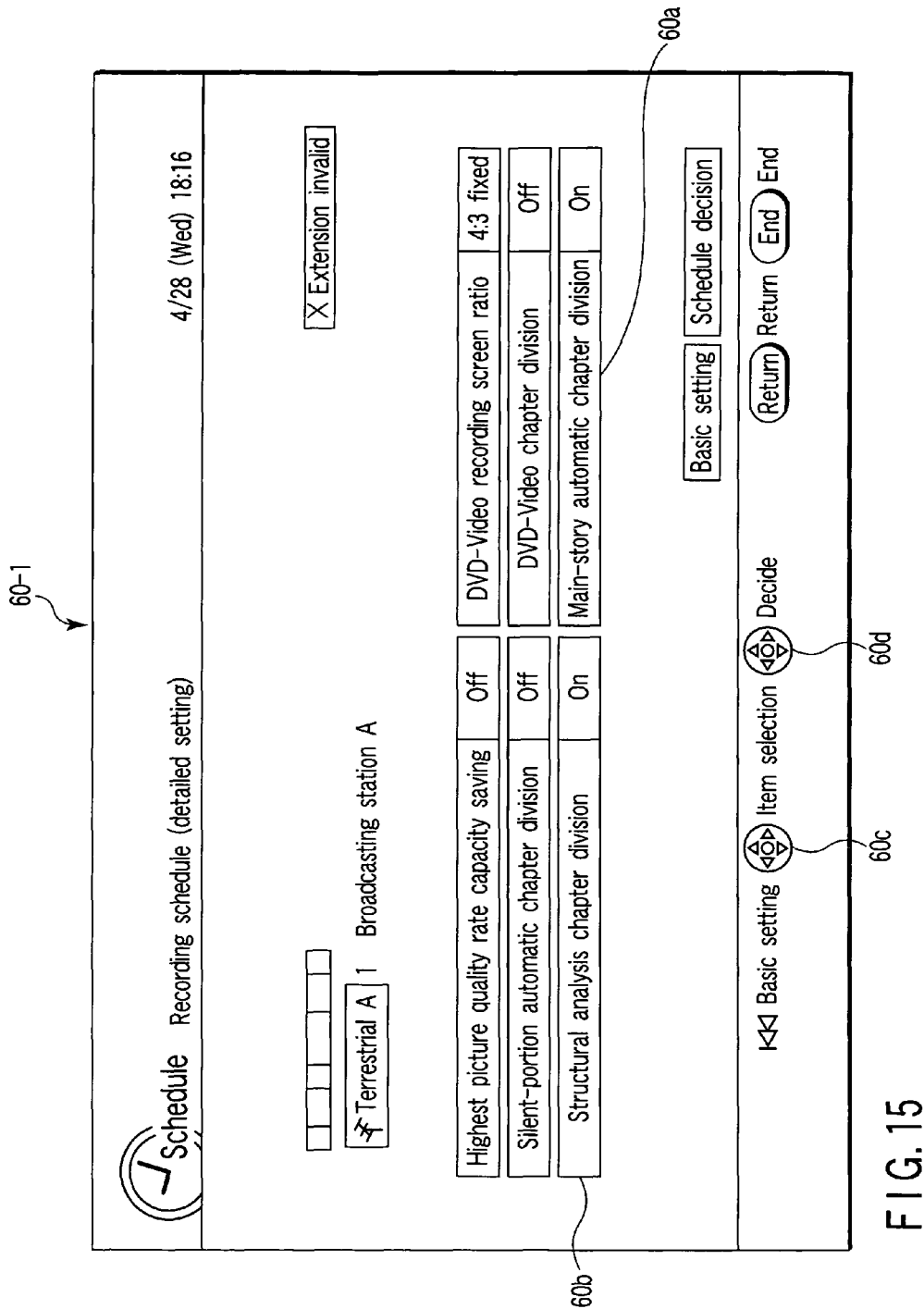
FIG. 15 shows a screen for setting a main-story automatic chapter division operation according to the present invention.

FIG. 15 is an example of a detailed setting screen 60 appearing when the user selects the "detailed setting" button on the scheduling screen to schedule the recording of one program and clicks the button. As shown in FIG. 15, the item "Main-story automatic chapter division" 60a is "On" This state means that the aforementioned chapter division operation can be achieved. The user can switch between "On" and "Off" cyclically by putting the cursor on the item 60a by remote control and pressing the decision key.

Further on this screen 60, the item "Magic chapter division" 60b is provided to make a structural analysis chapter division of a video signal. The function based on the "structural analysis chapter division" differs from the aforementioned function (featuring an accurate detection of commercial periods) based on "Main-story automatic chapter division" in the chapter division process.

As shown in FIGS. 8 and 9, the function based on "Structural analysis chapter division" is to analyze mostly video data and determine the similarities of fields or frames. In the main-story automatic chapter division function, on a screen 60-1 appearing when the detailed setting button is clicked on the recording scheduling screen, the item "Structural analysis chapter division" 60b appears. However, the item 60b for setting "Structural analysis chapter division" also appears by selecting a recording unit on the menu screen and then causing a screen for setting a recording function to appear.

Figure 16:
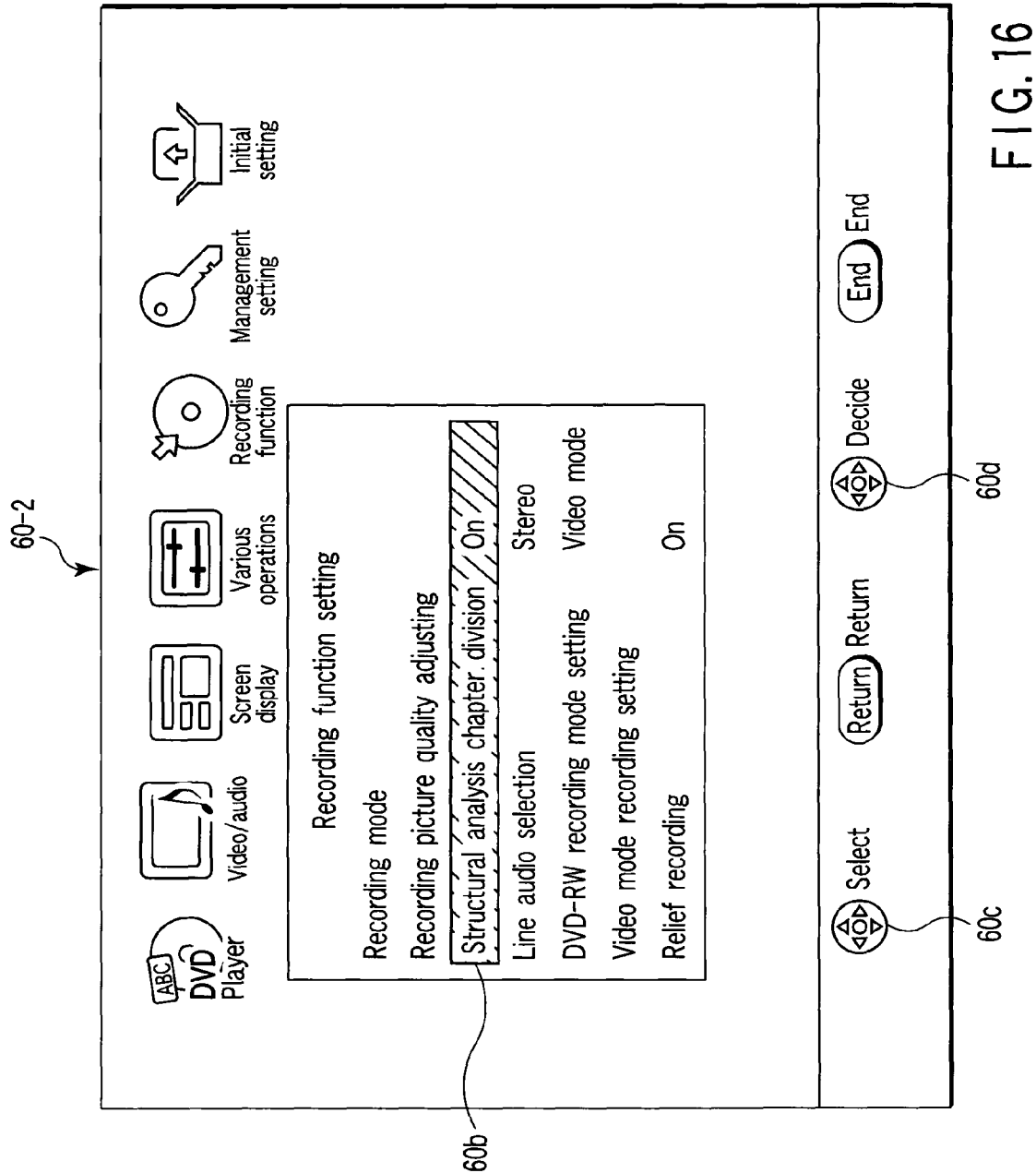
FIG. 16 shows a screen for setting the chapter division process explained in FIGS. 8 and 9.

FIG. 16 shows a case where the item "Structural analysis chapter division" 60b appears on a screen 60-2 for setting a recording function. On this screen, too, the item 60b for determining whether to make "structural analysis chapter division" appears, On the aforementioned screens 60-1, 60-2, the mark for the operation section of the remote controller is displayed. Specifically, the mark of a cursor key for moving the cursor upward, downward, rightward, and leftward and the mark of a decision key are displayed. These are useful marks in guiding the user's operation.

The processing method of the arbitrary interval detecting section 11q is not limited to the above embodiment. The arbitrary interval detecting section 11q may further detect the audio mode and add audio-mode information for use in the processing. For instance, the arbitrary interval detecting section 11q detects a change point in the audio mode and uses information on the detection of the change point.

For example, when it has been determined that greater part of the main story is in the stereo mode, the method explained in FIG. 10 to FIG. 14 is employed. When it has been determined that the stereo mode and the monaural mode are mixed in the main story, the mode change points may be added to the chapter division points, using information on change points in the audio mode. Here, the chapter division points in the arbitrary interval are ignored.

Figure 17:
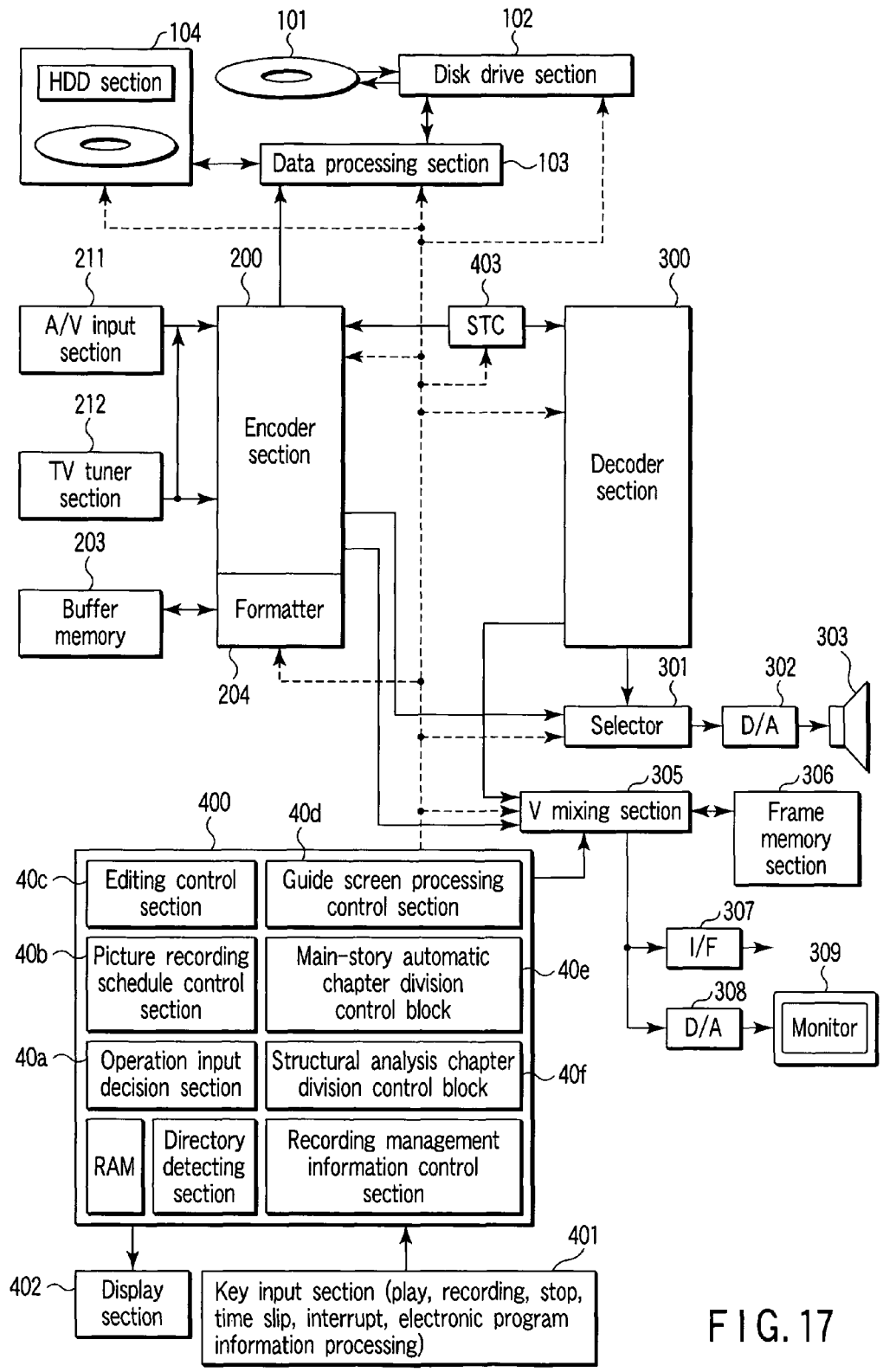
FIG. 17 is a block diagram showing the configuration of a recording and reproducing apparatus to which the present invention has been applied.

FIG. 17 shows an overall configuration of a recording and reproducing apparatus to which the present invention has been applied. The recording and reproducing apparatus has two types of disk drive sections. An optical disk 101 is an information recording medium in which a video file can be structured. A disk drive section 102 rotates the optical disk 101, thereby reading and writing information. Number 104 indicates a hard disk drive (HDD) section which drives a hard disk.

The data processor section 103 can not only supply recording data to the disk drive section 102 and hard disk drive section 104 but also receive a reproduced signal. The disk drive section 102 includes a rotation control system for the optical disk 101, a laser driving system, and an optical system.

The data processor 103, which deals with data in recording or reproducing units, includes a buffer circuit, a modulation/demodulation circuit, and an error correction section.

The recording and reproducing apparatus is mainly composed of an encoder section 200 that constitutes the recording system side, a decoder section 300 that constitutes the reproducing system side, and a microcomputer block 400 that supervises control of the operation of the overall apparatus. The encoder section 200 includes a video and audio analog-to-digital converter that digitizes an input analog video signal and an analog audio signal, a video encoder, and an audio encoder. The encoder section 200 further includes a sub-video encoder that compresses subtitles or the like.

The output of the encoder section 200 is converted into a specific DVD (such as, DVD-R, DVD-RW, or DVD-RAM) format at a formatter 204 including a buffer memory 203, which supplies the resulting signal to the data processor 103. An AV input section 211 inputs an external analog video signal and an external analog audio signal to the encoder section 200. Alternatively, a TV tuner 212 inputs an analog video signal and an analog audio signal to the encoder section 200. When a compressed digital video signal and digital audio signal are directly input, the encoder section 200 can supply the compressed digital video signal and digital audio signal directly to the formatter 204. Moreover, the encoder section 200 can supply an digitized video signal and audio signal directly to a video mixing section 305 and an audio selector 301, respectively.

The video encoder included in the encoder section 200 compresses a digital video signal at a variable bit rate conforming to the MPEG2 or MPEG1 standard. A digital audio signal is compressed at a fixed bit rate conforming to the MPEG or AC-3 standard or a linear PCM digital audio signal.

When a sub-video signal is input from the AV input section 211 (for example, a signal from a DVD video player with a sub-video signal independent output terminal) or when a DVD video signal with such a data-structure is broadcast and the TV tuner 212 receives the signal, the sub-video signal in the DVD video signal is encoded (or run-length encoded) at the sub-video encoder, which produces a sub-video bitmap.

The encoded digital video signal, digital audio signal, and sub-video signal are packed at the formatter 204 into video packs, audio packs, and sub-video packs. Furthermore, these are gathered together and converted into a format determined in the DVD-recording standard (for example, the standard followed in recording data onto a DVD-RAM, DVD-R, or DVD-RW).

Here, in the apparatus, the information (including video packs, audio packs, and sub-video packs) formatted at the formatter 204 and the management information created at the formatter 204 can be supplied via the data processor section 103 to the hard disk drive section 104 or disk drive section 102, which enables data to be written onto the hard disk or optical disk 101. Moreover, the information recorded on a hard disk or an optical disk may be recorded onto the optical disk 101 or hard disk via the data processor 103 or disk drive section 102.

Furthermore, the video objects of a plurality of programs recorded on the hard disk or optical disk 101 may be edited by, for example, deleting a part of the video objects or connecting an object of a different program to the video objects. This is possible because a data unit dealt with by the DVD format has been defined and processing signals in the data unit makes editing easier.

The microcomputer block 400 includes a microprocessing unit (MPU) or a central processing unit (CPU), a ROM in which a control program and others have been written, and a RAM for providing a work area necessary to execute a program.

According to the control program stored in the ROM, the MPU of the microcomputer block 400 detects a defective place and an unrecorded area, sets a picture recording information recording position, records UDF, and sets an AV address by using the RAM as a work area.

Furthermore, the microcomputer 400, which has an information processing section necessary to control the entire system, includes a work RAM, a directory detecting section, a VMG (overall video management information) information creating section, a copy-related information detecting section, a copy and scrambling information processing section (or RDI processing section), a packet header processing section, a sequence header processing section, and an aspect ratio information processing section.

Of the results of the execution of the MPU, those to be notified to the user are displayed on a display section 402 of the video data recording and reproducing apparatus or on a monitor display in on-screen display (OSD) form. The microcomputer block 400 has a key input section 401 that supplies an operation signal for operating the apparatus. On the basis of time data from a system time clock (STC) 403, the microcomputer block 400 realizes the timing with which it controls the disk drive section 102, hard disk drive section 104, data processor section 103, and encoder section 200 and/or decoder section 300.

The operation of recording or reproducing is usually carried out in synchronization with the time clock from the STC 403. The other processes may be carried out with the timing independent of the STC 403, The decoder 300 includes a separator that separates each pack from a pack-structure signal with the DVD-format, a memory used in separating packs and carrying out the other signal processing, a V decoder that decodes the main video data (or the contents of a video pack) separated at the separator, an SP decoder that decodes the sub-video data (or the contents of a sub-video pack) separated at the separator, and an A decoder that decodes the audio data (or the contents of an audio pack) separated at the separator. The decoder 30 further includes a video processor that combines the decoded main video with the decoded sub-video suitably and outputs the main video in such a manner that menus, highlight buttons, subtitles, and other sub-video are superimposed on the main video.

The output video signal of the decoder section 300 is input to the video mixing section 305. The video mixing section 305 composes text data. Connected to the video mixing section 305 are lines used to directly take in the signals from the TV tuner 212 and A/V input section 211. Further connected to the video mixing section 305 is a frame memory 306 used as a buffer. When the output of the video mixing section 305 is an analog output, it is output via an interface 307 to the outside. When the output of the video mixing section 305 is a digital output, it is output via a digital-to-analog converter 308 externally.

Furthermore, the video mixing section 305 can output a video signal for making a guide screen (or a screen explained in FIG. 6 or 9) as a GUI. The video signal is controlled by a guide screen processing control section in the microcomputer block 400. Moreover, the video mixing section 305 further includes an operation input decision section 40*a*, a picture recording schedule control section 40*b*, an editing control section 40*c*, and a guide screen processing control section 40*d*. The control section 400 can supervise the entire apparatus.

In addition, the microcomputer block 400 includes a control block 40*e* for making the aforementioned "main-story automatic chapter division" and a control block 40*f* for making the "magic chapter division."

When FIGS. 1, 10, and 17 are compared with one another, the tuner 1, tuner 21, and tuner 212 correspond to one another. Each of the tuner 1 of FIG. 1 and the tuner 212 of FIG. 17 includes the audio signal processing section 22 of FIG. 10. The CPU 11 of FIG. 1 corresponds to the silence detecting unit 25, silent time recording unit 26, silent portion interval computing unit 27, and chapter boundary setting unit 28. Moreover, the CPU 11 of FIG. 1 corresponds to the control section 400 of FIG. 17.

In FIG. 17, the output audio signal from the decoder section 300 is supplied via the selector 301 to the digital-to-analog converter 302, which converts the signal into an analog signal and outputs the signal externally. The selector 301 is controlled by the select signal from the microcomputer block 400. This enables the selector 301 to directly select a signal passed through the encoder section 200 when the digital signal from the TV tuner 212 or A/V input section 211 is monitored directly.

The formatter of the encoder section 200 creates each piece of segment information (such as information on GOP begin interrupt time) during picture recording and sends them periodically to the MPU of the microcomputer block 400. Segment information includes the number of video object unit (VOBU) packs, the end address of an I picture from the beginning of a VOBU, and the reproducing time of a VOBU.

At the same time, information from the aspect information processing section is sent to the MPU at the start of picture recording. The MPU creates VOB stream information (STI). Here, the STI holds resolution data, aspect data, and the like. In reproduction, each decoder section does initial setting on the basis of the information.

In the apparatus, one disk is allowed to have one video file. To continue reproduction without interruption while accessing (or seeking) data, a minimally contiguous information unit (size) has been determined. The unit is called a contiguous data area (CDA). The CDA size is a multiple of an error correction code (ECC) block (16 sectors). The file system records data in CDA units.

The data processor section 103 receives data in VOBU units from the formatter of the encoder section 200 and supplies data in CDA units to the disk drive section 102 or hard disk drive section 104. The MPU of the microcomputer block 400 creates management information necessary to reproduce the recorded data and, when recognizing a data recording end command, sends the created management information to the data processor section 103. Then, the management information is recorded onto the disk. Therefore, while encoding is being done, the MPU of the microcomputer block 400 receives information (including segment information) in data units from the encoder section 200. Furthermore, the MPU of the microcomputer block 400 recognizes the management information (file system) read from the optical disk or hard disk at the start of recording, then recognizes an unrecorded area on each disk, and sets the recording area of the data in the disk via the data processor section 103.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of controlling an apparatus for setting video signal delimiter information judged from audio and video signals, the method comprising:

analyzing the similarity between consecutive frames of a video signal and obtaining first delimiter information that provides delimitation according to the semantic content of the video signal;

analyzing an audio signal and detecting silent portions of the audio signal;

detecting an interval where the time interval between a silent portion and the next silent portion and the count of detected silent portions satisfy specific conditions;

creating second delimiter information for the first and last silent portions in the interval;

obtaining third delimiter information by superimposing the first and second delimiter information one on top of the other; and if the first delimiter information exists between the second delimiter information given to the first silent portion and that given to the last silent portion, rejecting the first delimiter information.

2. The method of setting video signal delimiter information judged from audio and video signals according to claim 1, wherein the specific conditions include detecting silent portions of an audio signal and determining whether the time interval between a silent portion and the next silent portion is a multiple of a specific time (A), and if the time interval is a multiple of the specific time (A), counting the number of times a silent portion is sensed, and if the count of the silent portions is equal to or larger than a threshold value (B), acquiring the second delimiter information for the first and last silent portions.

3. The method of setting video signal delimiter information judged from audio and video signals according to claim 2, wherein the interval set with the second delimiter information is an interval determined by the control section to be a commercial interval.

4. The method of setting video signal delimiter information judged from audio and video signals according to claim 1, wherein the spacing between the second delimiter information given to the first silent portion and that given to the last silent portion is an interval determined by the control section to be a music portion.

5. An apparatus which has a video structuring section that analyzes the similarity between consecutive frames of a video signal and obtains first delimiter information that provides delimitation according to the semantic content of the video signal, the apparatus comprising:

an arbitrary interval detecting section which analyzes an audio signal and which includes a silence detecting section, a storage section which stores a silence detection time at which a silent portion was detected, a silent portion time interval measuring section which measures the time interval between a silent portion and the next silent portion, and a silent portion counting and condition determining section which not only determines that the time interval between silent portions is a multiple of a specific time (A) and identifies a specific number (B) of consecutive silent portions but also sets second delimiter information in the first and last silent portions; and a boundary setting section to which the first delimiter information and the second delimiter information from the condition determining section are input and which creates third delimiter information by superimposing the first and second delimiter information one on top of the other and, if the first delimiter information exists between the second delimiter given to the first silent portion and that given to the last silent portion, rejects the first delimiter information.

6. The apparatus for setting video signal delimiter information judged from audio and video signals according to claim 5, further comprising a first holding section which holds the first delimiter information and a second holding section which holds the second delimiter information, wherein the boundary setting section creates the third delimiter information using the first delimiter information from the first holding section and the second delimiter information from the second holding section.

7. The apparatus for setting video signal delimiter information judged from audio and video signals according to claim 5, further comprising an encoder which encodes the video signal and a recording unit into which the output of the encoder and the third delimiter information obtained at the boundary setting section are recorded.

8. The apparatus for setting video signal delimiter information judged from audio and video signals according to claim 5, wherein the arbitrary interval detecting section and the boundary setting section are included in the control section.

9. The apparatus for setting video signal delimiter information judged from audio and video signals according to claim 5, further comprising an encoder which encodes the video signal and a hard disk drive into which the output of the encoder and the third delimiter information obtained at the boundary setting section are recorded.

10. The apparatus for setting video signal delimiter information judged from audio and video signals according to claim 5, further comprising an encoder which encodes the video signal and a digital video disk drive into which the output of the encoder and the third delimiter information obtained at the boundary setting section are recorded.

* * * * *